Oct. 20, 1964   S. W. KUNDRACH ETAL   3,153,430
SELVAGE FORMING MECHANISM FOR WEAVING MACHINES
Filed May 12, 1958                                   5 Sheets-Sheet 1

INVENTOR.
STEVE W. KUNDRACH
WALTER A. HOFMANN
BY   JOHN FISHER
ATTORNEYS

Oct. 20, 1964 S. W. KUNDRACH ETAL 3,153,430
SELVAGE FORMING MECHANISM FOR WEAVING MACHINES
Filed May 12, 1958 5 Sheets-Sheet 2

INVENTOR.
STEVE W. KUNDRACH
WALTER A. HOFMANN
JOHN FISHER
BY
ATTORNEYS

Oct. 20, 1964     S. W. KUNDRACH ETAL     3,153,430
SELVAGE FORMING MECHANISM FOR WEAVING MACHINES
Filed May 12, 1958     5 Sheets-Sheet 3

INVENTOR.
STEVE W. KUNDRACH
WALTER A. HOFMANN
JOHN FISHER
BY
Hudson, Boughton,
Williams, David & Hofmann
ATTORNEYS

INVENTOR.
STEVE W. KUNDRACH
WALTER A. HOFMANN
JOHN FISHER
ATTORNEYS

United States Patent Office 3,153,430
Patented Oct. 20, 1964

3,153,430
SELVAGE FORMING MECHANISM FOR
WEAVING MACHINES
Steve W. Kundrach, Parma, Walter A. Hofmann, Lyndhurst, and John Fisher, Cleveland, Ohio, assignors to The Warner & Swasey Company, Cleveland, Ohio, a corporation of Ohio
Filed May 12, 1958, Ser. No. 734,572
5 Claims. (Cl. 139—126)

This invention realtes to selvage forming mechanism for weaving machines.

More particularly the invention relates to weaving machines provided with selvage forming mechanisms for producing a tucked selvage in one or both marginal sides of the woven cloth or fabric and especially in cloth or fabric wherein the filaments, although flexible, are relatively stiff as, for instance, are wire, plastic or other similar relatively stiff filaments.

The production of woven cloth or fabric provided on one or both longitudinal margins with a tucked selvage is well known and such woven cloth or fabric has the selvage or selvages formed by turning the cut end or ends of the weft or filling filaments back into the fabric and tucking or inter-weaving the inturned end or ends into the warp filaments adjacent the margin or margins into the cloth or fabric. Selvages have been thus formed in cloth or fabric produced from yarn, wire, or other filaments.

Weaving machines of the needle type or the gripper shuttle type and wherein the wefts or fillings are each separate and have opposite cut ends projecting from the longitudinal margins of the cloth or fabric heretofore have been provided with mechanisms for tucking such cut ends into the cloth or fabric to form tucked selvages. In such weaving machines after each filling or weft has been beaten up by the reed and the shed reverses for the next pick the selvage forming mechanisms bend the projecting end or ends of the beaten up filling or weft inwardly approximately 180° into the shed in the plane of the cloth and substantially parallel to the fillings or wefts so that the inturned ends are interwoven with the marginal warp filaments and interlocked into the fabric when beat up by the reed and produce tucked selvages in the fabric or cloth. These weaving machines have functioned efficiently and have produced satisfactory tucked selvages in the woven cloth or fabric.

The present invention contemplates the provision in a weaving machine of improved mechanism adapted particularly for producing tucked selvages in woven cloth or fabric wherein the filaments though flexible are relatively stiff as compared to yarn filaments as, for instance, wire, plastic or paper filaments.

When the weaving machines are utilized to weave fabric or cloth formed of relatively stiff filaments it has been found advantageous to adapt the selvage forming mechanisms for functioning with the relatively stiff filaments due to certain problems presented by the inherent characteristics of the relatively stiff filaments as compared to yarn filaments.

In the production of woven cloth or fabric having relatively stiff filaments or wefts it is important that the bending in of the cut ends of the wefts or fillings be uniform to assure an even selvage. When the wefts or fillings are relatively stiff there is a tendency during the beat-up operation to impart a rolling as well as a sliding movement to the fillings or wefts thus producing therein a torsional twist which tends to displace the projecting cut ends of the fillings or wefts out of the axes thereof and the plane of the cloth or fabric. Consequently, unless the displaced ends of the fillings or wefts are properly reversably bent and tucked into the fabric or cloth the selvage produced in the fabric or cloth may be uneven and unsatisfactory and may have protruding or loose ends since the tucking mechanism may skip proper operation on certain of the ends.

The principal object of the present invention is to provide in a weaving machine improved selvage forming mechanism capable of producing satisfactory tucked selvages even though the fabric or cloth is woven from relatively stiff flexible filaments.

Another object of the present invention is to provide in a weaving machine a selvage forming mechanism that produces a tucked selvage and which effects the bending of the projecting cut end or ends of the weft or filling in two stages during the selvage forming operation.

Another object of the invention is to provide in a weaving machine mechanism for producing a tucked selvage and which mechanism functions efficiently on each weft or filling to bend and tuck uniformly and evenly the cut end thereof into the fabric or cloth even though the flexible weft or filling is relatively stiff and the cut end thereof may have a tendency to be displaced from the filling axis or the plane of the cloth or fabric due to torsional stresses occurring in the weft or filling during the beat-up operation.

More particularly and specifically it is an object of the invention to provide in a weaving machine a tucked selvage forming mechanism which restrains, guides and controls the projecting cut end of the filling or weft during the beat-up operation and maintains said end in the plane of the cloth or fabric.

A still further and important object of the invention is to provide in a weaving machine improved selvage forming mechanism which positively controls and effects the bending of the projecting cut end of the filling or weft reversely into the plane of the cloth or fabric.

Another object of the invention is to provide in a weaving machine a mechanism for producing a tucked selvage with accurate and parallel spacing of the bent and tucked ends of the fillings or wefts relative to the adjacent fillings or wefts.

A still further object is to provide in a weaving machine a selvage forming mechanism as referred to in the previous objects and which provides accurate control of and uniformity in the size of the loop formed by the bent and tucked ends of the filling or wefts.

Another object is to provide in a weaving machine improved selvage forming mechanism capable of producing tucked selvages of various desired widths and in cloth or fabric formed of relatively stiff woven filaments.

A further and more general object is to provide tucked selvage forming mechanisms for weaving machines capable of functioning on various types of filling materials operable at high speeds and producing uniform selvages.

Other objects and advantages inherent in the invention but not specifically enumerated above will become apparent during the following detailed description of several embodiments of the invention illustrated in the accompanying drawings forming part of this specification and wherein.

FIG. 3 (Sheet 2) is a view partly in side elevation and partly in section of the picking box of the weaving machine illustrated in FIGS. 1 and 2 and including a preferred embodiment of the selvage forming mechanism of the present invention.

FIG. 3ª is a fragmentary view on a larger scale of a portion of FIG. 3 to more clearly illustrate how the bent filling end is transferred positively from the forming block to the forming finger.

FIG. 4 is a sectional view taken substantially on irregular line 4—4 of FIG. 3 looking in the direction of the arrows.

FIG. 5 is a fragmentary sectional view taken substantially along line 5—5 of FIG. 3 looking in the direction of the arrows.

FIG. 6 is a fragmentary view, partly in section and partly in plan, and shows a part of the stationary forming block and the movable forming finger of the selvage mechanism in retracted position by full lines and in extended position by dash lines.

FIG. 6ª is a detail view similar to FIG. 6 but indicating in full lines the modified construction of the stationary block which is indicated in dotted lines in said FIG. 6.

For purposes of illustration the invention will be described herein as embodied in a weaving machine of the gripper shuttle type, but it should be understood that the invention can be utilized in other types of weaving machines where it is necessary to bend and tuck the cut ends of the fillings or wefts to produce a selvage as, for instance, the needle type of weaving machine or in the ordinary shuttle type of loom where two or more widths of cloth are being woven simultaneously and it is desired to form a center selvage.

It will be further understood that preferably the selvage forming mechanisms of the present invention will be located in the weaving machine adjacent both marginal edges of the cloth or fabric where both ends of the wefts or fillings are cut, but for purposes of simplifying the description and disclosure the mechanism for one side only will be referred to and in the present illustration it will be the picking box side of the machine although such mechanism also could be at the receiving box side.

Figure 1:
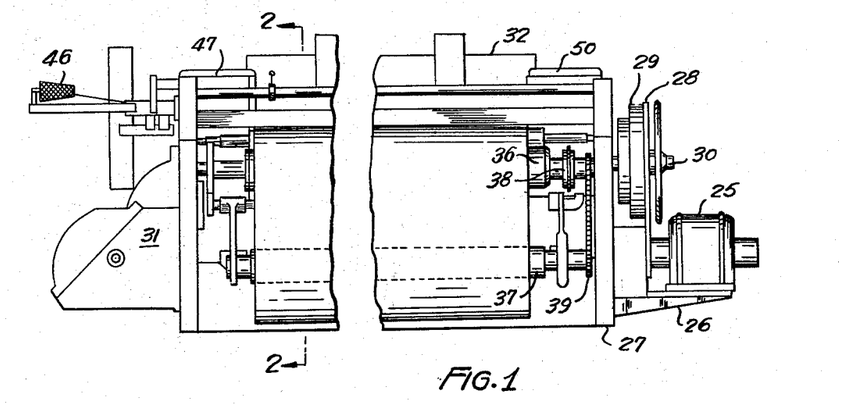
FIG. 1 is a front centrally broken away elevational view of a weaving machine in which a selvage forming mechanism embodying the present invention may be mounted.
Figure 2:
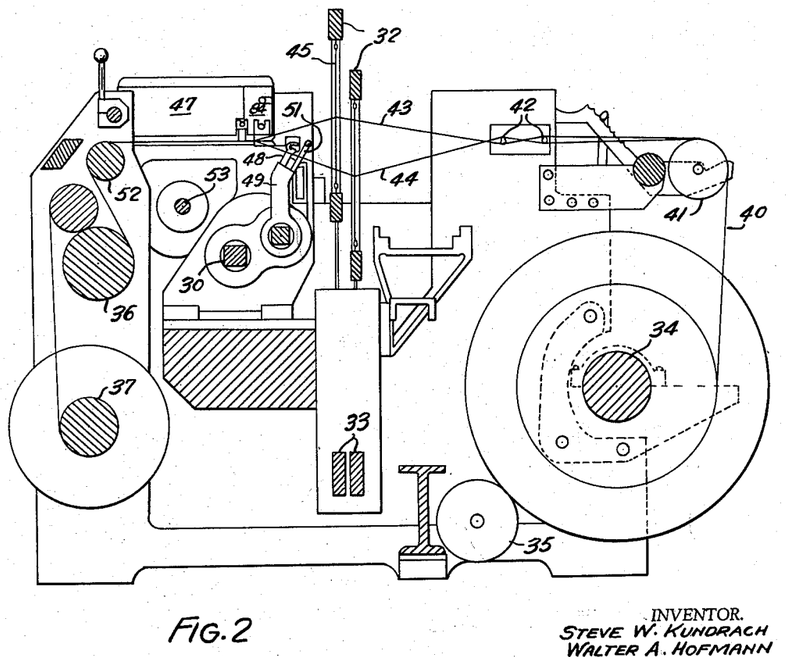
FIG. 2 is a longitudinal vertical sectional view through the weaving machine of FIG. 1 and is taken substantially on line 2—2 of FIG. 1 looking in the direction of the arrows.

Reference will now be made to FIGS. 1 and 2 for a brief general description of the gripper shuttle type of weaving machine shown therein. The machine is driven from a main drive motor 25 mounted on a bracket 26 secured to a frame side member 27. The motor 25 through a drive belt 28 and clutch 29 operates the main drive shaft 30 which extends transversely the width of the weaving machine. The machine includes the harness drive box 31 driven from the main drive shaft 30 through suitable gearing and driving connections not illustrated. It will be understood that the harness drive box contains mechanism for operating the harness or heddle mechanism 32 through actuating rods 33. The main drive shaft 30 also actuates the warp let-off motion by rotation of the warp beam 34 through a driving connection that includes the gear 35, see FIG. 2. Likewise the takeup motion of cloth roll 37 is actuated from the main drive shaft. The woven cloth or fabric is wound on the cloth roll 37 that is driven from the takeup roll 36 by a driving connection including a slip clutch 38 and chain 39. The warp filaments 40 are unwound from the warp beam 34 and pass over the whip roll 41 and then around lease rods 42 and then are connected to the heddles 45 in the harnesses 32 to be moved to form sheds 43 and 44.

A spool or package 46 of the filling or weft filaments is located at the picking side of the machine and a series of gripper shuttles grip the filling or wefts and are fired from the picking box 47 through the sheds along a path formed by shuttle guides 48 carried by lay bar 49 and into the receiving box 50 at the opposite side of the machine. As the shuttles are received in the receiving box the fillings are clamped at the opposite sides of the fabric and the shuttles release the fillings and are returned to the picking box as will be well understood. The clamped filling is then cut by cutting mechanisms at the opposite marginal sides of the fabric to provide projecting ends, after which the lay bar 49 positively driven from the main drive shaft 30 moves the reed 51 forward to beat up the filling, after which the shed is reversed and a new filling or weft is fired therethrough and the process repeated. All of the mechanisms referred to are operated in proper timed relationship by actuating means as will be well understood.

As the cloth is woven it moves toward the front of the machine and over the breast beam 52 to the takeup roll 36. The picking box mechanism is driven from the main drive shaft 30 and the receiving box mechanism, in turn, is driven from the picking box mechanism through a connecting shaft 53 and thus synchronization between the two mechanisms is obtained.

The picking box mechanism and the receiving box mechanism are quite different in their operation with respect to the handling of the shuttles but insofar as these mechanisms function in operating the selvage forming mechanisms there is similarity and thus it should be necessary herein only to describe the selvage forming mechanism for one side of the machine, in this instance the picking box side, it being understood that the selvage forming mechanism for the receiving box side will be similar but reversed in position to the mechanism on the picking box side.

The description heretofore set forth with respect to the weaving machine of the gripper shuttle type has been general and brief, since the construction and operation of these machines are well understood in the art and are shown in a number of prior United States Letters Patent as, for instance, the following: Moessinger 2,639,732; Pfarrwaller 2,644,488; and Pfarrwaller 2,578,205.

A preferred form of selvage forming mechanism embodying the invention and incorporated in the weaving machine will now be described with particular reference to FIGS. 3 to 6 inclusive.

Figures 3, 3A, 4, 5, 6, 6A:
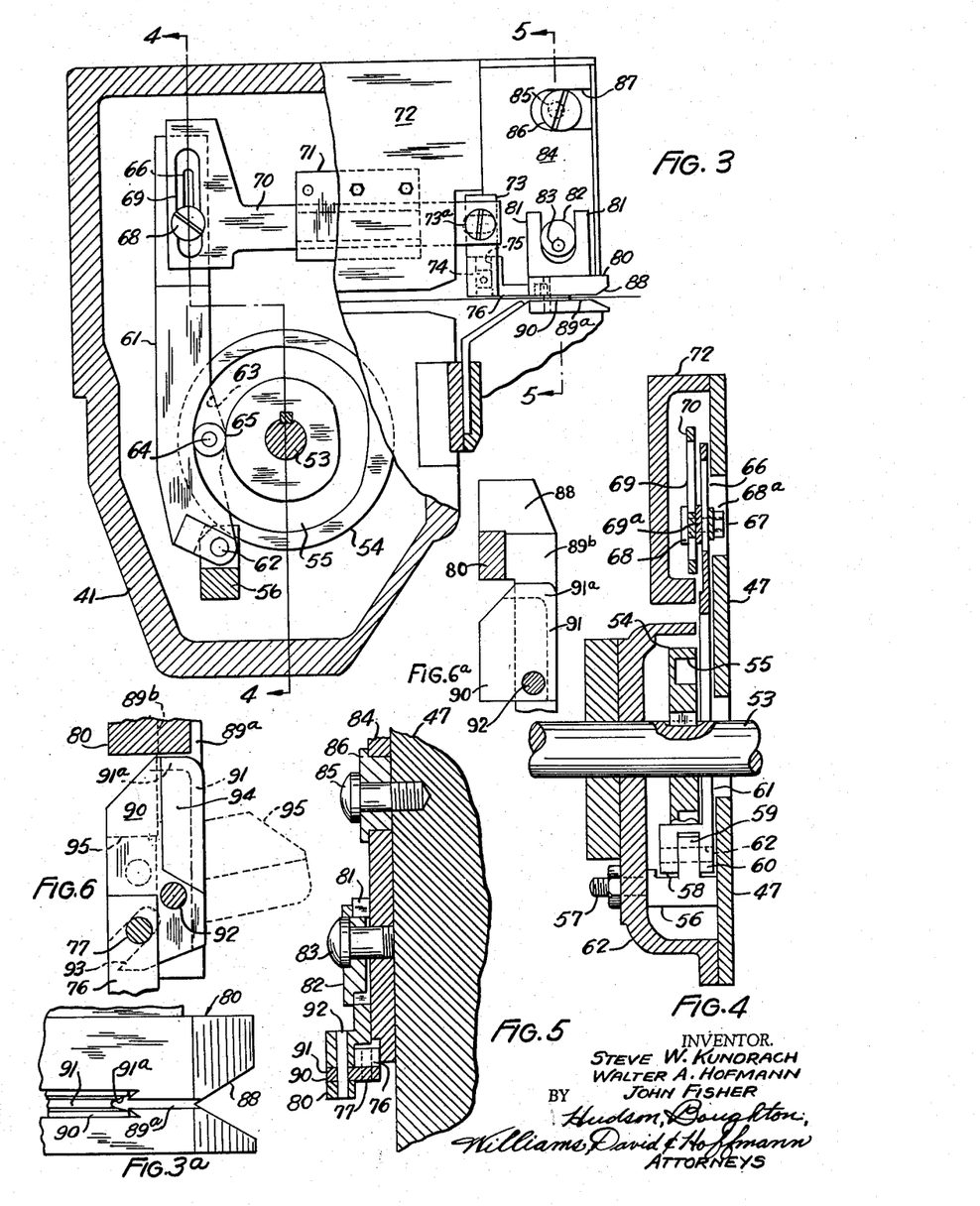

Referring to FIG. 3 illustrating the picking box 47, it will be seen that the connecting shaft 53 through which the receiving box mechanism 50 is driven from the picking box mechanism in proper timed relationship has fixed to it within the picking box 47 a face cam 54 provided with a cam groove 55. The picking box 47 internally of the lower portion thereof has secured therein a pivot block 56, said pivot block 56 being secured in position by a bolt 57 and nut screwed thereon.

The pivot block 56 is provided on its upper side with a recess 58 from which extends upwardly a tongue 59. The tongue 59 is located intermediate the tines 60 of the forked lower end of a cam follower arm or lever 61. The tines 60 are pivotally connected to the tongue 59 by a pivot pin 62 extending through the tines and said tongue.

The cam follower arm or lever 61 extends upwardly in the picking box 47 and has a widened portion 63 overlying the face cam 54 and the cam groove 55 therein. The widened portion 63 of the cam follower arm or lever mounts a stud 64 which carries a cam follower roller 65 located in the cam groove 55 of the face cam 54. The cam follower arm or lever 61 at its upper or free end is provided with a longitudinally extending slot 66 having extending therethrough a pivot connecting bolt 67 provided on one end with a head 68 and on its other end with a nut and washer assembly indicated at 68a. The head end of the bolt 67 extends through a slot 69 in a widened portion of a connecting bar 70 and the head 68 of the bolt is of a diameter greater than the width of said slot.

A spacer plate 69a is located intermediate the cam follower arm 61 and the connecting bar 70 and the bolt 67 extends through said spacer plate and with proper adjustment of the nut and washer assembly 68a adjustably pivotally connects the upper end of the cam follower arm 61 and the one end of the connecting bar 70.

It will be noted that the length of the cam follower arm or lever 61 between its pivot pin 62 and the cam follower 65 is always constant while the position of the bolt 67 in the slots 66 and 69 can be adjusted to vary the effective length of that portion of the cam follower arm between the cam follower 65 and the bolt 67 to vary, in turn, the length of reciprocating movement imparted to the connecting bar 70 by the rocking movement of the cam follower arm 61. This adjustment is for setup purposes.

The connecting bar 70 is given reciprocatory movement by the cam follower arm or lever 61 and is guided in such movement by a guide block 71 secured to the inside of the side wall 72 of the picking box 47.

The other or free end of the connecting bar 70 remote to lever 61 extends outwardly through an opening in the side wall 72 of the picking box and a depending arm 73 is secured to the free end of the connecting bar 70 for limited adjustment longitudinally of the connecting bar for setup purposes by means of a bolt and slot connection indicated at 73a in FIG. 3.

The arm 73 depends downwardly from the connecting bar 70 and carries adjacent its lower end a shoe 74 located in a vertical slot 75 provided in the upwardly extending end portion of a reciprocating link 76. The link 76 at its end opposite to that provided with the upwardly extending end portion mounts a vertically depending pin 77, see FIG. 5, which connects the link 76 with a movable or rockable forming finger 90 later to be described in further detail.

A mounting plate 84 is secured to the picking box 47 by means of a screw 85 and an eccentric bushing 86 cooperating with a horizontal slot 87 formed in the mounting plate 84. A stationary forming block 80 is connected to the mounting plate 84 by an upstanding forked portion 81 of the forming block providing a vertical slot through which extends a screw 83 attached to the mounting plate 84 and mounting in turn an eccentric bushing 82 cooperating with the said vertical slot, see FIGS. 3 and 5.

The stationary forming block 80 on its end toward the reed when the latter is in retracted position prior to its beat-up movement is provided with a relatively deep V-shaped groove or slot 88 constituting restraining means to receive the projecting cut end of the filling and center and restrain the same from any displacement from the plane of the cloth or fabric due to torsional twist in the filling during the beat-up operation.

The side of the forming block adjacent to the margin of the fabric or cloth is inclined from the end provided with the groove 88 toward the fabric or cloth and is provided with a groove 89 shallower than the groove 88 and communicating therewith and adapted to receive and restrain against displacement from the plane of the fabric the cut end of the filling as it is bent by its engagement with the block during beat-up.

The forming block 80 on its side adjacent to the fabric or cloth and at the inner end of the inclined portion having the groove 89 is straight for a distance and grooved as indicated at 89a and is parallel to the margin of the cloth or fabric, see FIG. 6 and FIGS. 10 to 14 inclusive.

The grooves 88, 89 and 89a constitute restraining means to maintain the cut end of the weft from displacement out of the plane of the cloth or fabric.

The stationary forming block is provided with a slot in which is pivotally mounted the rockable forming finger 90 that is pivotally mounted on a pin 92 carried by the forming block 80, see FIGS. 5 and 6. The movable forming finger 90 is provided with an inclined slot 93 into which extends the pin 77 carried by the link 76, said pin 77 and slot 93 operatively connecting the forming finger 90 and the link 76 so reciprocation of the link rocks the finger.

The side edge of the forming finger 90, which when the forming finger is in retracted position, is adjacent to the fabric or cloth is provided with a shallow groove 91 that aligns and forms a continuation of the restraining groove in the straight portion 89a of the edge of the forming block 80. The end of the forming finger 90 adjacent to the straight portion 89a of the forming block is also provided with a shallow groove 91a extending transversely of the forming finger and forming a continuation of the groove 91.

The top and bottom surfaces of the forming finger 90 are beveled toward the fabric or cloth, as indicated at 94, so that the forming finger can move into the shed with a minimum distortion or bending of the warps when the finger is in extended position. In FIG. 6 the forming finger 90 is indicated in its retracted position by full lines and in its fully extended position by dash lines 95.

Assuming that the machine is operating it will be understood the connecting shaft 53 is rotating in timed relationship with the main drive shaft 30 and that the picking box mechanism, receiving box mechanism, the harness drive mechanism, the beat-up mechanism and the other operative parts of the machine are all functioning in timed relationship. Also it will be understood that successive picks of the filling or wefts are being made through the successive sheds. The face cam 54 rotates with the connecting shaft 53 and the cam follower arm 61 is rocked by the engagement of the cam follower 65 in the cam groove 55. This rocking or oscillation of the cam follower arm 61 reciprocates the connecting bar 70 and the link 76 is reciprocated with the connecting bar through its connection therewith by the depending arm 73.

The reciprocation of the link 76 causes the pin 77 carried thereby and extending into the inclined slot 93 of the forming finger 90 to rock said forming finger 90 from its full line retracted position of FIG. 6 to its fully extended dash line position and back to said retracted position. This rocking of the forming finger 90 is in timed relation to the forming of successive sheds and the beat-up operation of the reed 51 as will later be more fully referred to with reference to the schematic showing of FIGS. 10 to 14 inclusive.

It is important that the stationary forming block 80 which carries the movable forming finger 90 be properly adjusted to predetermined position so as to correctly align with the shed. Also the adjustment should provide the correct amplitude and timing for the rocking forming finger 90 in relationship to the operation of the beat-up mechanism of the machine. The provision for the requisite adjustments just referred to was previously described heretofore, however, further reference thereto should be given at this time.

Th eccentric bushing 86 that cooperates with the horizontal slot 87 in the mounting plate 84 can be rotated to raise or lower the mounting plate 84 and, in turn, the forming block 80 carried thereby adjusted vertically the desired and necessary predetermined amount. Also the eccentric bushing 82 which cooperates with the vertical slot in the portion 81 of the forming block 80 can be rotated to adjust the horizontal position of the forming block 80.

The amplitude of reciprocating movement of the connecting bar 70 and of the rocking movement of the forming finger 90 can be adjusted by adjusting the position of the pivot connecting bolt 67 that operatively interconnects the cam follower arm or lever 61 and the connecting bar 70. Also to provide the proper setup adjustments of the forming finger 90 the depending arm 73 can have adjustment relative to the connecting bar 70 because of the bolt and slot connection 73a therebetween. Since the depending arm 73a carries the shoe 74 that operates in the slot 75 of the upstanding end portion of the link 76, vertical adjustment of the forming block 80 and forming finger 90 is taken care of so far as the operative connection between the arm 73 and the link 76 is concerned.

Figure 10:
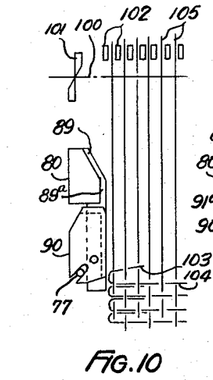
FIGS. 10, 11, 12, 13 and 14 are schematic views illustrating the relationship of the parts during the operation of the embodiment illustrated in FIGS. 3 to 6 inclusive.

The manner in which the selvage forming mechanism heretofore described functions during the cycle of operation of the machine will now be described with particular reference to FIGS. 10 to 14 inclusive. Reference first will be made to FIG. 10 wherein the weft of filling which has just been fired through the shed is indicated at 100. The projecting end of the weft or filling 100 is engaged by the shears 101 and is cut thereby as the dents 102 of reed 51 start forward on the beat-up. At this time the forming finger 90 is in the retracted position while the bent and tucked cut end 103 of the previous and beat-up filling 104 has been bent almost 180° to a position parallel to the filling or weft. As the dents 102 of the reed 51 move forwardly during the beat-up operation, the weft or filling 100 and its now cut projecting end 106 is moved forwardly from the position of FIG. 10 to the position of FIG. 11, at which time the cut end 106 has engaged in the restraining means or groove 89 in the inclined edge of the forming block 80 and has been initially bent to an angular position relative to the axis of the filling 100. The cut end 106 engages in the groove 89 and said groove stabilizes the position of the cut end to prevent the same from whipping out of the plane of the cloth or fabric due to torsional twist which might occur in the weft 100 as it is moved forward by the reed. This is particularly important since at this time it is preferable that the shed be closed to insure proper filling control and this produces on the filling 100 a frictional resistance from the warps and the filling tends to roll. The engagement of the cut end 106 in the groove 89 constrains the now partially bent cut end to the plane of the cloth or fabric and against whipping action.

Figures 11, 12:
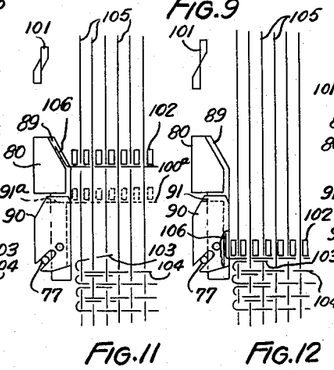
Figures 13, 14:
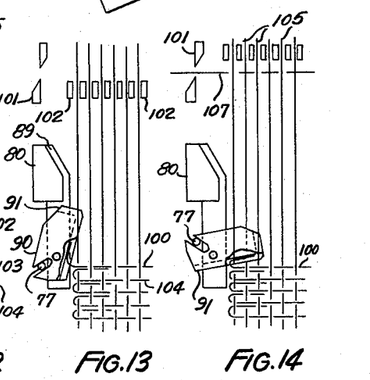

As the machine continues to operate the dents 102 of the reed 51 move from the position shown in FIG. 11 to the position shown in FIG. 13 and the partially bent cut end 106 of filling or weft 100 moves from the groove 89 into the groove 89a of the straight edge portion of the forming block 80 and thence into groove 91 in the side edge of the forming finger 90 and this effects further bending of the cut end 106 to approximately a right angle position with respect to the filling 100. The reed in FIG. 12 is in full beat-up position and the filling 100 in its movement to final beat-up position completes the bending of the cut end 103 of the previous filling 104 so that said cut end is now bent inwardly substantially 180° and is now parallel to the filling 100. The reed now moves rearwardly from the position of FIG. 12 to the position of FIG. 13 and during this time the shed is reversing.

The operational timing of the mechanism for actuating the selvage forming mechanism is such that when the reed has moved rearwardly so as not to be engaged by the forming finger 90 the link 76 has been moved by the actuating bar 70 so that the pin 77 operating in slot 93 starts to rock the forming finger inwardly of the new shed from the position shown in FIG. 12 to the position shown in FIG. 13 and this rocking movement commences further bending of the cut end 106 of the now beat-up filling or weft 100 from its 90° position toward its final bent position. The reed continues its rearward movement until it is in its most rearward position, i.e., the position of FIG. 10, at which time a new filling or weft 107 is fired through the shed as indicated in FIG. 14. As the rearward movement of the reed continues the forming finger 90 rocks farther into the shed to its most advanced rocked position to further bend the cut end 106 of the filling 100 to approximately but not quite its 180° bent position. After this has occurred the operation of the machine rocks the forming finger from the position of FIG. 14 back to the position of FIG. 10 and the shears 101 function to cut the end of the new filling or weft 107. Also at this time the shed is closed for the start of the beat-up operation. It will be understood that the cycle of operation described with respect to the filling or weft 100 is now repeated with respect to the new filling or weft 107 and when the latter is fully beat-up it contacts the end 106 of weft 100 and completes the bending thereof to its 180° position wherein it is parallel with the weft 100.

It will be understood that the bent end 106 is tucked and interwoven into the warp filaments of the fabric adjacent the margin by the bending and the operations just hereinbefore described.

In some circumstances it might be desirable to have the initial bending of the cut end of the last inserted weft or filling take place somewhat later in the cycle although still relatively early in the beat-up movement of the filling or weft in order to reduce the distance through which the filling or weft with the initially bent cut end is moved during the remainder of the beat-up movement. An embodiment of the selvage forming mechanism which accomplishes this is shown in FIG. 6a. In this variation the block 80 such as is shown in FIGS. 3a and 6 is modified so that the grooves 89 and 89a are eliminated and are replaced by a groove 89b indicated in dotted lines in FIG. 6 and in full lines in FIG. 6a and of a depth such as to receive the cut end of the weft or filling therein without bending the same. As the weft is moved under the action of the reed during beat-up the projecting cut end is guided first by groove 88 and then by groove 89b to prevent its being whipped out of the plane of the cloth due to the torsional twist produced during beat-up. However, the cut end as stated is not angularly bent at this time. After the cut end of the weft or filling being beat-up has passed through the groove 89b it engages the groove 91a in the free end of the then stationary forming finger 90. This groove 91a serves to initially bend the cut end of the filling or weft in the same manner as did groove 89.

After the cut end of the weft has been initially bent by its engagement with the groove 91a in the free end of the then stationary forming finger 90, the groove 91 in the forming finger which extends parallel to the cloth being woven serves to constrain the bent end in the plane of the cloth during the remainder of the beat-up movement. The operation of the forming finger 90 remains the same as in the previously described embodiment to complete the bending of the cut end of the weft or filling back into the shed after the reed returns to retracted position upon the completion of the beat-up movement and the shed reverses.

In describing the cycle of operations with respect to FIGS. 10 to 14 inclusive no reference has been made to the take-up action and said action may be either continuous or intermittent, so long as the fabric or cloth moves sufficiently during the bending and tucking operation to prevent the forming finger from engaging and cutting the marginal warps of the fabric.

It will be observed that the initiation of the bending operation of the cut end of the fillings or wefts is determined by the relationship of the outermost dent 102 of the reed and the forming block so that the point of bend of the ends of the fillings will be the same for successive fillings even though the fillings may have minor differences in the material thereof such as hard or soft spots, frayed places, etc. Also the manner and direction in which the forming finger operates to further bend the cut ends at the same point of bend as the initial point of bend provides uniformity in the loops formed by the bent ends so that these loops project the same distance beyond the outermost warp film and provide a regular and smooth selvage border.

Figures 7, 8, 9:
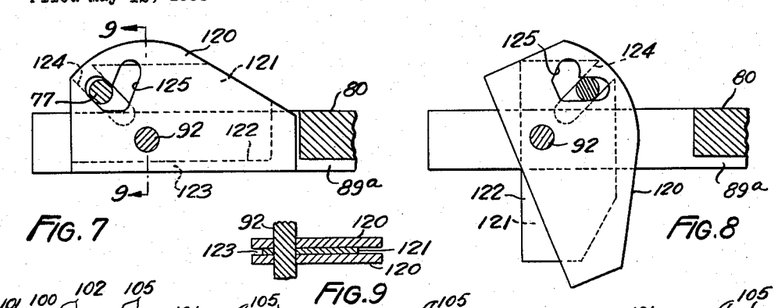
FIG. 7 (Sheet 3) is a detail view partly in section and illustrates a modified form of movable forming finger from that shown in FIG. 6 and with said modified form of forming finger in retracted position, said view being turned 90° out of position to conserve space.
FIG. 8 is a view similar to FIG. 7 but illustrates the modified movable forming finger in fully extended position.
FIG. 9 is a section taken approximately on line 9—9 of FIG. 7 looking in the direction of the arrows but turned 90° from FIG. 7.

Instead of the one-piece rockable forming finger 90 previously described a modified construction of movable forming finger may be employed such as that shown in FIGS. 7, 8 and 9. In this modified construction of rockable forming finger three superimposed blades constitute the finger. These three blades consist of the lower and upper or outermost identical blades 120 and an inner or intermediate blade 121. All three blades are pivoted on the pin 92 for rocking movement while the outermost blades 120 are of heavier gauge material than the intermediate blade 123 in the construction shown in FIGS. 7, 8 and 9, but it will be understood that the gauge of the blades may be varied depending upon the requirements of particular filling materials.

The edge of the intermediate blade 121 that is adjacent to the margin of the cloth or fabric is set back or recessed with respect to the corresponding edges of the blades 120 and this provides a groove or restraining means 123 which when this construction of forming finger is in its retracted position is in alignment with the groove 89a of the forming block 80.

The upper and lower blades 120 are provided with registering V-shaped slots 125 while the intermediate blade 121 is provided with a straight slot 124 registering with one of the legs of the V-shaped slots 125 but of longer length than said legs.

The pin 77 of the sliding link 76 extends into the slots 124 and 125 and the latter are so related that movement of the pin to effect rocking of the forming finger first causes all the blades to move outwardly in unison and this condition exists during a substantial portion of the outward rocking movement of the forming finger. After the blades have reached a partially outwardly rocked position the movement of the pin 77 in the slots 125 is an idle movement and the upper and lower blades 120 do not rock farther. However, the additional movement of the pin 77 in the straight inclined slot 124 causes additional rocking movement of the intermediate blade 121 so that at the end of the outer rocking movement of the forming finger the outer blades 120 and the intermediate blade 121 will have the relative positions shown in FIG. 8.

The outer blades 120 function primarily to control the cut end of the filling against whipping action during a substantial portion of the bending of the cut end. However, the outer blades do not enter the shed to the same extent as the intermediate blade, and hence during the final bending of the cut end of the filling by the intermediate blade the outer blades are stationary and thus there is obviated likelihood of objectionable distortion of the shed or damage to the warp filaments caused by the relatively thick outer blades.

It will be understood the modified construction of forming finger shown in FIGS. 7 to 9 inclusive functions similarly to the manner in which the single forming finger 90 functioned as described with reference to FIGS. 10 to 14 inclusive.

Figure 15:
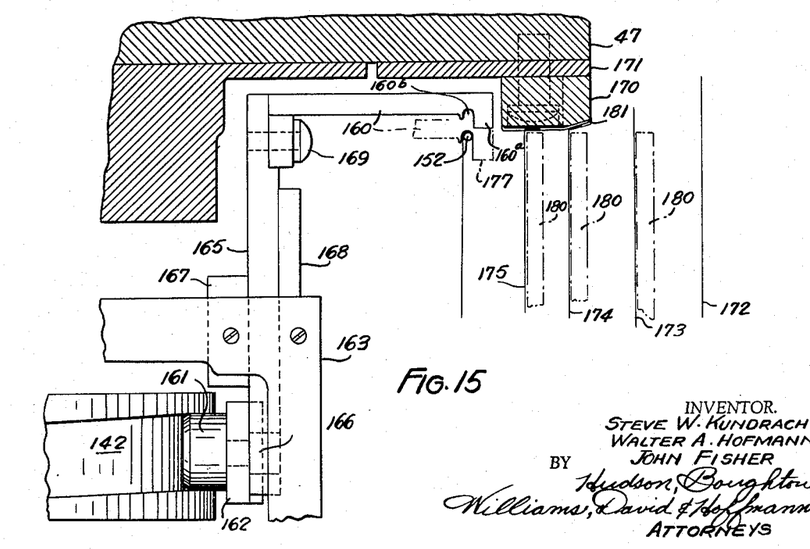
FIG. 15 is a view partly in section and partly in plan and shows a further embodiment of the invention than those illustrated in the preceding views and illustrates the progressive operative steps in the bending of the projecting cut end of the filling or weft.
Figure 16:
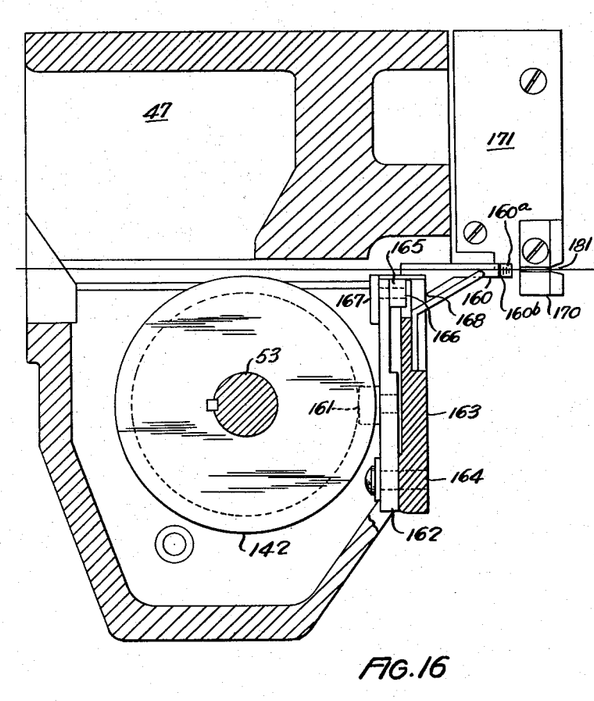
FIG. 16 (Sheet 4) is a view partly in side elevation and partly in section of a picking box with the embodiment of the invention illustrated in FIG. 15 included therein.
Figure 17:
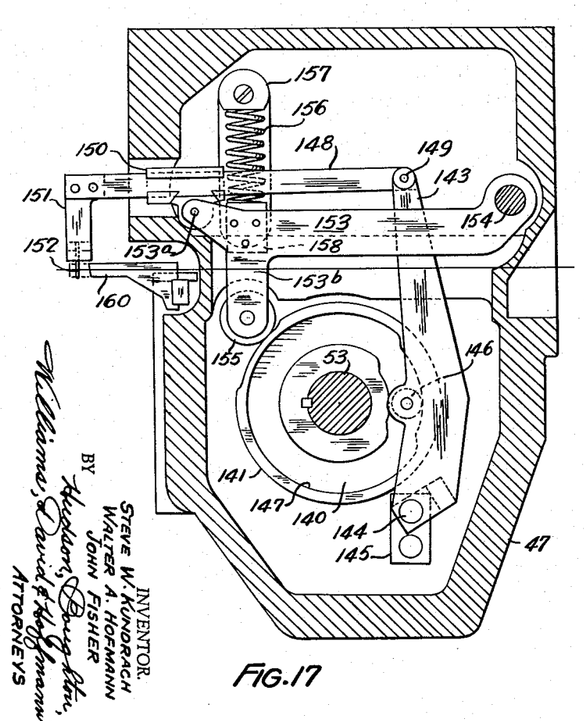
FIG. 17 is a section through the picking box shown in FIGS. 15 and 16 and is taken looking inwardly thereof to illustrate the mechanism for operating the forming pin.

Reference will now be made to FIGS. 15, 16 and 17 wherein there is illustrated another embodiment of the invention and which embodiment effects initial bending of the cut end of the filling by a stationary forming block, after which the bight of the bend is engaged by a vertically movable pin to stabilize the bending point and then a movable forming arm completes the inward bending of the end of the filling about the pin and the latter is automatically withdrawn upon the completion of the bend. This embodiment provides for accurately locating the point of bend in the cut ends of the fillings and assures highly uniform loops for the selvage.

The modified mechanism shown in FIGS. 15, 16 and 17 is illustrated as located in the picking box 47. In this modified construction the connecting shaft 53 within the picking box has fixed thereto a face cam 140, a disk cam 141 and a barrel cam 142. As in the first described embodiment of the invention the picking box 47 internally thereof mounts a pivot block 145 to which the lower end of a follower lever 143 is pivotally connected by a pivot pin 144. The follower lever 143 intermediate its ends mounts a cam follower roller 146 which is located in the cam groove 147 of the face cam 140. A connecting rod 148 has one of its ends pivotally connected to the upper end of the follower lever 143 by means of a pivot pin 149. The connecting rod 148 is mounted in a guide 150 for reciprocating movement and said rod projects beyond the guide and outwardly of the picking box and its outer end has secured to it a depending arm 151, the lower end of which mounts a forming pin 152 about which the partially bent cut ends of the fillings or wefts are bent farther, as will later be explained. Also, one end of a second follower lever 153 is pivotally connected to the picking box by a pivot pin 154. The follower lever 153 extends substantially horizontally and transversely to the followed lever 143 as clearly shown in FIG. 17.

The opposite end of the follower lever 153 is upwardly inclined and is pivotally connected to the guide 150 as indicated at 153a in FIG. 17. The follower lever 153 inwardly of its end that is pivotally connected to the guide 150 and on its lower edge is provided with a depending arm 153b which at its lower end mounts a cam follower roller 155 that operates in contact with the circumference of the disk cam 141. The follower lever 153 is subject to the load of a compression spring 156, one end of which engages an abutment bracket 158 fixed to the lever 153 and the other end of which engages a fixed abutment 157 secured internally to the picking box 47.

The spring 156 functions to maintain the cam follower roller 155 in engagement with the circumference of the disk cam 141 and also reacts on the follower lever 153 with a spring load when said lever is rocked upwardly by the action of the disk cam 141. It will be understood that the rotation of the connecting shaft 53 rocks the follower lever 143 to reciprocate the connecting rod 148 and move the forming pin 152 inwardly and outwardly in a substantially horizontal or lateral direction. Also rotation of the connecting shaft 53 functions to raise and lower the follower level 153 and due to the pivotal connection 153a with the guide 150 to rock said guide and impart a rising and falling motion to the connecting rod 148 and forming pin 152 in timed relationship to the substantially horizontal reciprocating movements of said connecting rod and forming pin. The purpose of this arrangement will become apparent subsequently.

The barrel cam 142 on the connecting shaft 53 actuates a forming arm 160 that cooperates with the pin 152 in bending the cut ends of the filling about the pin. The operative connections between the forming arm 160 and the barrel cam 142 will now be described.

A lever arm 162 has its lower end pivotally connected by a pivot pin 164 to a frame member 163. The lever arm 162 intermediate its ends mounts a cam follower roller that functions in engagement with the barrel cam 142 so that rotation of said cam with the connecting shaft 53 imparts rocking movements to the lever arm 162. The upper end of the lever arm 162 is pivotally connected by a pivot pin 166 to one end of an arm 165 that is slidably guided between rail portions 167 and 168 carried by the frame member 163. The end of the arm 165 that is remote to its pivotal connection with the follower lever 162 is rigidly connected by a connection 169 to one end of the forming arm 160. The opposite end of the forming arm 160 is provided with a short right angled portion 160a and the arm 160 on the remote side of the portion 160a is provided with a recess 160b, the purpose of which will later become apparent.

The forming block 170 is carried by a mounting plate 171 secured to the picking box 47 and suitable adjustments may be provided for accurately positioning the forming block 170 and the mounting plate 171 as, for instance, adjustments comparable to those described with respect to the forming block and mounting plate of the first embodiment of the invention.

The end of the forming block toward which the filling is beat-up is beveled, as indicated in FIG. 15, and is provided with a groove 181 which extends along the entire side of the forming block 170 that is adjacent to the fabric or cloth and said groove is engaged by the cut end of the filling and the forming block imparts an initial bend to said cut end while the groove or restraining means stabilizes the cut end against whipping action.

Referring particularly to FIG. 15, a filling or weft which has just been fired through the shed is indicated at 172. Also the filling 172 is indicated at 173 after it has been engaged by the reed 180 and has started its beat-up movement toward the forming block 170. When the filling 172 has reached position 174 in its beat-up movement the cut end of the filling has engaged the forming block 170 and has initially been bent thereby and is located in the groove 181 of the forming block. When the filling 172 has reached position 175 in the beat-up movement the cut end has been bent slightly farther to approximately 90° by engagement with the side of the forming block that is parallel to the warp filaments and said cut end is still in the groove 181. Further movement of the filament 172 from position 175 in the beat-up action brings the same to a position wherein the forming pin 152 moves downwardly and engages the filling within the bend of the cut end thereof. After the reed starts its retracting movement following completion of the beat-up action the forming arm 160 moves toward the margin of the fabric and the short right angled end portion 160a of said arm engages the cut end and completes the bending thereof from a right angle position to a position 180° of bend wherein the cut end is substantially parallel to the filling. At this time the bend or loop of the filling with the pin therein is located in the recess 160b of the forming arm and the latter is as indicated by dash lines 177 in FIG. 15.

The forming arm 160 now moves away from the margin of the fabric toward its full line position of FIG. 15 and the forming pin 152 is raised and disengaged from the bend in the filling. It will be understood that the cycle is repeated for each filling fired through the successive sheds. Also the groove 181 in the forming block 170 may be eliminated if desired as the forming pin 152 after its engagement with the loop provides sufficient control of the further bending of the loop into the fabric.

Figure 18:
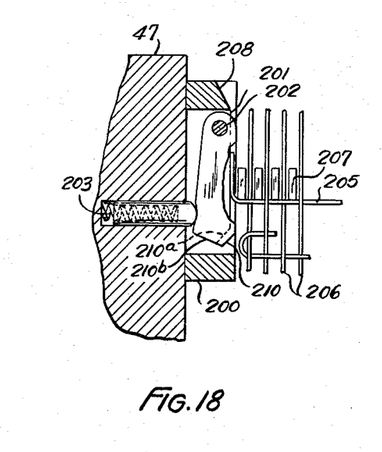
FIG. 18 (Sheet 5) is a detail sectional view illustrating a still further embodiment of the invention with the parts shown in the position they occupy during the beat-up operation.
Figure 19:
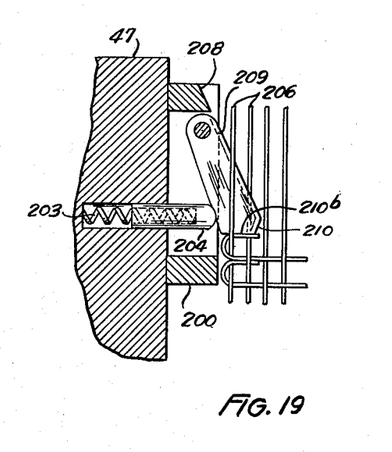
FIG. 19 is a view similar to FIG. 18 but illustrates the relationship of the parts at the termination of the bending and tucking operation after the beat-up operation and the reversal of the shed.

In FIGS. 18 and 19 a still further embodiment of the invention is illustrated. In this form of the invention a stationary forming block 200 is carried by the picking box 47 adjacent to the margin of the cloth or fabric being woven and the end of the forming block that is toward the reed when the latter is in retracted position is provided with an inclined surface 208 extending from said end of the forming block toward the opposite end thereof and inclined toward the margin of the cloth or fabric.

The forming block 200 is provided with a recess that extends from the inner end of the inclined surfaced notch surface 208 toward the opposite end of the forming block and parallel to the margin of the cloth or fabric and in which recess a forming finger 201 is pivotally mounted on a pivot pin 202. The forming finger 201 is normally moved outwardly from the position shown in FIG. 18 to the position shown in FIG. 19 by a plunger 204 which engages the rear edge of the finger and is under the load of the spring 203.

The forming finger 201 on its edge adjacent to the cloth or fabric is provided with a longitudinally extending groove 209 that merges with a groove 210a formed in one side of the angled free end 210 of the forming finger, the other side of said angled free end being indicated at 210b. The cut end of the filling or weft 205 which is being beaten up by the reed 207 will engage first in the inclined surfaced notch 208 and be partially bent thereby as the reed moves forward in its operation. Also as the reed moves forwardly in the beat up operation it will contact the forming finger 201 and move the latter toward the position of FIG. 18 and against the action of the plunger 204. When the forming finger has been thus moved so that it is substantially parallel to the warp filaments the cut end of the weft 205 will be in the groove 209 of the forming finger and will have been bent substantially 90° to the axis of the weft or filling 205.

When the reed has completed its beat up movement and is moving rearwardly the forming finger 201 is freed gradually to swing outwardly from the position shown in FIG. 18 to that shown in FIG. 19 and under the action of the spring loaded plunger 204. As this is occurring the shed if reversed and the outward movement of the forming finger first causes the groove 210a to receive the cut end of the filling 205 and initiate its farther bending into the shed. Then as the forming finger moves farther outwardly the side 210b of the angled free end 210 of the forming finger contacts the cut end and completes the bending thereof to a position substantially parallel to the axis of the weft or filling 205 as shown in FIG. 19.

The embodiment shown in FIGS. 18 and 19 has the advantage that the forming finger is operated in one direction by the movement of the reed toward beat-up position and in the opposite direction as the reed moves away from beat-up position by the spring pressed plunger 204. Consequently it is not necessary to provide actuating mechanism for the forming finger driven in timed relationship to the other operating parts of the weaving machine, although it will be understood that should it be desired to have the forming finger 201 positively actuated a suitable drive mechanism driven in timed relationship to the other parts of the machine could be provided as, for instance, the barrel cam mechanism shown in the embodiment of FIGS. 15, 16 and 17.

Figure 20:
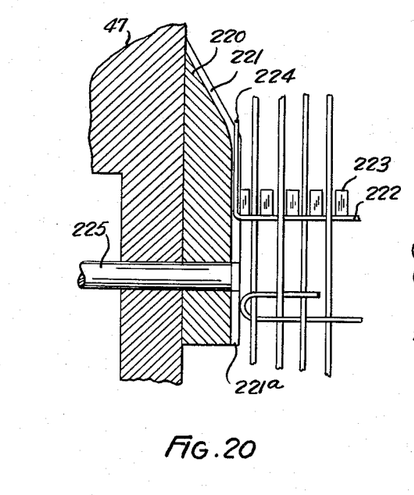
FIG. 20 is a somewhat schematic sectional illustration of a still further embodiment of the invention and illustrates the relationship of the parts when the projecting end of the filling or weft has been bent approximately 90° during the beatup operation.
Figure 21:
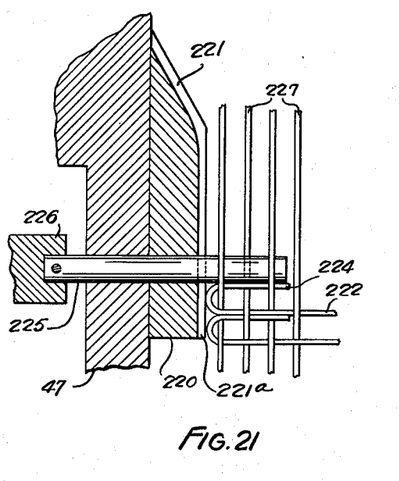
FIG. 21 is a view similar to FIG. 20 but illustrates the relationship of the parts of this further embodiment of the invention when the projecting end of the filling or weft has been bent farther inwardly of the fabric or cloth from the 90° position of FIG. 20 to approximately a 180° position after the beat-up operation and the reversal of the shed.

In FIGS. 20 and 21 another embodiment of the invention is illustrated. In the embodiment of the selvage forming mechanism shown in FIGS. 20 and 21 the stationary forming block that is secured to the picking box 47 is indicated at 220 and this forming block extends generally in a parallel direction to the margin of the web of cloth or fabric.

The end of the forming block that is toward the reed when the latter is in retracted position is inclined and is provided with a groove 221 sloping from the picking box toward the fabric and communicating at its inner end with a longitudinal groove 221a formed in the side of the forming block that is adjacent and substantially parallel to the cloth or fabric.

The picking box 47 and the forming block 220 are provided with aligned bores in which is slidably mounted a forming element 225 which, in this instance, is a forming rod that can be reciprocated in a direction parallel to the axis of the wefts or fillings of the fabric. The forming element 225 can be actuated by mechanism driven in timed relationship to the other operating parts of the weaving machine and which may include a reciprocating arm 226 that is connected to the end of the forming element within the picking box 47.

If desired in place of the reciprocating arm 226 the actuating mechanism for the forming element 225 might be a cam engageable with the end of the forming element for positively moving the same in a bending direction while a spring could be provided for moving the same in the opposite direction.

In FIGS. 20 and 21 the warp filaments are indicated at 227 while the weft or filling that is being or has just been beat up is indicated at 222. It will be understood that when the reed 223 is moving forwardly in its beat-up action it will move the weft or filling 222 forwardly and the cut end 224 thereof will first engage the inclined groove 221 and be bent to an angular position relative to the axis of the weft or filling by such engagement. Then as the reed 223 continues its forward movement during the beat-up action the cut end 224 will move into the longitudinal groove 221a of the forming block 220 and be bent around the reed 223 to a position substantially at right angles to the axis of the filling or weft.

When the beat-up of the filling or weft 222 has been completed and the reed 223 is moving rearwardly from the beat-up position and has cleared the cut end 224 the recipricating arm 226 acts on the forming element or rod 225 to bend the cut end 224 farther and into the position shown in FIG. 21 wherein it is substantially parallel to the axis of the weft or filling. This farther bending of the cut end 224 occurs when the shed has been reversed and a new filling is being fired therethrough. Then the reciprocating forming element 225 is retracted to the position shown in FIG. 20, the reversed or new shed is closed and the beat-up of the most recently fired weft or filling occurs.

Although a number of different embodiments or forms of the invention have been illustrated and described herein it will be understood that the invention is susceptible of additional modifications, embodiments or forms such as come within the scope of the appended claims.

Having thus described our invention, we claim:

1. In a weaving machine of the cut end weft or filling type adapted to weave wire or other cloth or fabric having relatively stiff flexible filaments and including picking mechanism, shed forming heddle mechanism, beat-up reed mechanism, weft or filling cutting mechanism, and actuating means for operating said mechanism in timed relationship; a selvage forming mechanism comprising a forming arm pivoted on the machine adjacent to a margin of the cloth or fabric, and operative connections between said forming arm and said actuating means and operating in timed relationship to said previously named mechanisms to rock said forming arm from a stationary position wherein it is parallel to the margin of the cloth or fabric during beat-up to a displaced position after the beat-up and into the reversed shed, said forming arm having a free end engageable in said stationary position by the projecting cut end of the last picked filling or weft and acting positively to bend said cut end to an angular position relative to the axis of said filling or weft, said forming arm having a longitudinal side edge which acts on said bent cut end as said arm is rocked to said displaced position to bend said cut end farther and into the reversed shed and substantially parallel to the axis of the weft or filling, said operative connections between said forming arm and said actuating means including a shaft driven by said actuating means, a cam rotatable with said shaft, a pivoted lever having a cam follower engaging said cam to rock said lever in response to the rotation of said cam, a reciprocating connecting bar connected to said lever, and further operative connections between said connecting bar and said forming arm, said lever having one end pivotally mounted on the machine while its opposite end is operatively connected to one end of said reciprocating connecting bar and said cam follower is carried by said lever intermediate its ends, the connection between said opposite end of said lever and said one end of said connecting bar being a pivotal connection the axis of which is adjustable longitudinally of said lever whereby the amplitude of reciprocating movement of said connecting bar can be adjustably varied, said further operative connections between said connecting bar and said rockable forming arm including a connecting arm extending transversely of said connecting bar adjacent the free end thereof, and means operatively connecting said connecting arm with said connecting bar for adjustment longitudinally of said bar.

2. In a weaving machine of the cut end weft or filling type adapted to weave wire or other cloth or fabric having relatively stiff flexible filaments and including picking mechanism, shed forming heddle mechanism, beat-up reed mechanism, weft or filling cutting mechanism, and actuating means for operating said mechanisms in timed relationship; a selvage forming mechanism comprising a forming arm pivoted on the machine adjacent to the margin of the cloth and fabric, and operative connections between said forming arm and said actuating means and operating in timed relationship to said previously named mechanisms to rock said forming arm from a stationary position wherein it is parallel to the margin of the cloth or the fabric during beat-up to a displaced position after beat-up extending into the reversed shed, said operative connections between said forming arm and said actuating means including a reciprocating connecting bar and operative connections between said connecting bar and said forming arm to rock said forming arm on reciprocation of said connecting bar, said operative connections including a first adjustable means for adjusting the stroke of said reciprocating connecting bar and second adjustable means for adjusting the angular position of said forming arm relative to said connecting bar.

3. In a weaving machine of the cut end weft or filling type adapted to weave wire or other cloth or fabric having relatively stiff flexible filaments and including picking mechanism, shed forming heddle mechanism, beat-up reed mechanism, weft or filling cutting mechanism, and actuating means for operating said mechanisms in timed relationship; a selvage forming mechanism comprising a forming arm pivoted on the machine adjacent to the margin of the cloth and fabric, and operative connections between said forming arm and said actuating means and operating in timed relationship to said previously named mechanisms to rock said forming arm from a stationary position wherein it is parallel to the margin of the cloth or the fabric during beat-up to a displaced position after beat-up extending into the reversed shed, said operative connections between said forming arm and said actuating means including a driven shaft, a cam rotatable with said shaft, a pivoted lever having a cam follower engaging said cam to rock said lever in response to the rotation of said cam, a reciprocating connecting bar, an adjustable connection connecting said bar to said lever and adjustable to vary the stroke of said bar upon reciprocation of said lever, and further operative connections between said connecting bar and said forming arm including a member operatively connected to said arm and adjustably connected to said bar for movement along the bar in the direction of reciprocation thereof for adjusting the angular position of said forming arm relative to said reciprocating connecting bar.

4. In a weaving machine of the cut end weft or filling type adapted to weave wire or other cloth or fabric having relatively stiff flexible elements and including picking mechanism, shed forming heddle mechanism, beat-up reed mechanism, weft or filling cutting mechanism, and actuating means for operating said mechanisms in timed relationship, a selvage forming mechanism comprising a forming arm pivoted on the machine adjacent to the margin of the cloth or fabric, and operative connections between said forming arm and said actuating means and operating in timed relationship to said previously named mechanisms to rock said forming arm from a stationary position wherein it is parallel to the margin of the cloth or fabric during beat-up to a displaced position after beat-up extending into the reversed shed, said forming arm acting to bend the projecting cut end of the last picked filling or weft into the reversed shed and substantially parallel to the axis of the weft or filling, said operative connections between said forming arm and said actuating means including a shaft driven by said actuating means, a cam rotatable with said shaft, a pivoted lever having a cam follower engaging said cam to rock said lever in response to the rotation of said cam, a reciprocating connecting bar connected to said lever, further operative connections between said connecting bar and said forming arm, said lever having one end pivotally mounted on the machine while its opposite end is operatively connected to one end of said reciprocating connecting bar and said cam followers carried by said lever intermediate its ends, the connection between said opposite end of said lever and said one end of said connecting bar being a pivotal connection the axis of which is adjustable longitudinally of said lever whereby the amplitude of reciprocating movement of said connecting bar can be adjustably varied, and said further operative connections between said connecting bar and said rockable arm including a connecting arm extending transversely of said connecting bar adjacent the free end thereof and means operatively connecting said connecting arm with said connecting bar for adjustment longitudinally of said bar.

5. In a weaving machine of the cut end weft or filling type adapted to weave wire or other cloth or fabric having relatively stiff flexible filaments and including picking mechanism, shed forming heddle mechanism, beat-up reed mechanism weft or cutting mechanism, and actuating means for operating said mechanisms in timed relationship; a selvage forming mechanism comprising a forming arm rockable on the machine adjacent to a margin of the cloth or fabric being woven, operative connections between said forming arm and said actuating means and operating in timed relationship to said previously named mechanisms to rock said forming arm from a stationary position wherein it is parallel to the margin of the cloth or fabric during substantially the entire beat-up to a displaced position after the beat-up extending into a reversed shed, said forming arm having a longitudinal side edge and a free end which extends outwardly of the longitudinal side edge in the plane of the cloth and which is disposed to be engaged by the outer end of the projecting cut end of the last picked filling or weft during beat-up and which acts positively to initially bend said cut end about a positive bending fulcrum adjacent the outermost warp to an angular position relative to the axis of said filling during beat-up, said free end having a groove therein for receiving substantially the entire length of the projecting end portion of the weft prior to any bending thereof, guide means in advance of said forming arm to receive the last picked weft during beat-up and provide an unobstructed path for said weft and to guide movement of the weft into said groove in said free end of said forming arm prior to any bending thereof and to limit said weft against movement out of the plane of the cloth or fabric, said forming arm having a groove in its longitudinal side edge for receiving the projecting cut end of the last picked filling or weft which has been bent to a position extending substantially parallel to the margin of the cloth or fabric and which communicates with said groove in said free end and said forming arm when rocked to said displaced position operating to bend said projecting end portion received in the longitudinal side groove further into the reversed shed.

References Cited in the file of this patent
UNITED STATES PATENTS

| | | |
|---|---|---|
| 1,426,351 | Brooks | Aug. 22, 1922 |
| 1,948,051 | Rossmann | Feb. 20, 1934 |
| 2,245,584 | Harter | July 17, 1941 |
| 2,267,287 | Moessinger | Dec. 23, 1941 |
| 2,592,820 | Moessinger | Apr. 15, 1952 |
| 2,602,472 | Pfarrwaller | July 8, 1952 |
| 2,839,090 | Webber et al. | June 17, 1958 |
| 2,849,029 | Webber et al. | Aug. 26, 1958 |
| 2,918,946 | Pfarrwaller | Dec. 29, 1959 |
| 2,946,354 | Webber et al. | July 26, 1960 |

FOREIGN PATENTS

| | | |
|---|---|---|
| 583,104 | France | Oct. 25, 1924 |
| 172,564 | Switzerland | Jan. 16, 1935 |

UNITED STATES PATENT OFFICE
CERTIFICATE OF CORRECTION

Patent No. 3,153,430                                    October 20, 1964

Steve W. Kundrach et al

It is hereby certified that error appears in the above numbered patent requiring correction and that the said Letters Patent should read as corrected below.

Column 13, line 63, for "mechanism" read -- mechanisms --.

Signed and sealed this 9th day of March 1965.

(SEAL)
Attest:

ERNEST W. SWIDER
Attesting Officer

EDWARD J. BRENNER
Commissioner of Patents